United States Patent
Wang et al.

(10) Patent No.: US 9,941,940 B2
(45) Date of Patent: Apr. 10, 2018

(54) SECTORIZED BEAM OPERATION FOR WIRELESS NETWORKS

(71) Applicant: MediaTek Singapore Pte. Ltd., Singapore (SG)

(72) Inventors: James June-Ming Wang, San Marino, CA (US); Jianhan Liu, San Jose, CA (US); Yung-Ping Hsu, Taipei (TW); Chih-Shi Yee, Hsinchu County (TW); Chao-Chun Wang, Taipei (TW); Vishakan Ponnampalam, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/413,694

(22) PCT Filed: Jul. 10, 2013

(86) PCT No.: PCT/SG2013/000289
§ 371 (c)(1),
(2) Date: Jan. 8, 2015

(87) PCT Pub. No.: WO2014/011117
PCT Pub. Date: Jan. 16, 2014

(65) Prior Publication Data
US 2015/0139116 A1 May 21, 2015

Related U.S. Application Data

(60) Provisional application No. 61/669,904, filed on Jul. 10, 2012, provisional application No. 61/677,208,
(Continued)

(51) Int. Cl.
*H04B 7/04* (2017.01)
*H04B 7/0408* (2017.01)
(Continued)

(52) U.S. Cl.
CPC .......... *H04B 7/0408* (2013.01); *H04B 7/0495* (2013.01); *H04W 16/28* (2013.01); *H04B 7/0695* (2013.01)

(58) Field of Classification Search
CPC .. H04B 7/0408; H04B 7/0695; H04B 7/0495; H04W 16/28
(Continued)

(56) References Cited

U.S. PATENT DOCUMENTS

2001/0006517 A1* 7/2001 Lin ................... H04W 72/0453
370/348
2003/0073463 A1* 4/2003 Shapira ................. H01Q 1/246
455/562.1
(Continued)

FOREIGN PATENT DOCUMENTS

WO 03026221 A1 3/2003

OTHER PUBLICATIONS

XiaoFeng Lu et al., An adaptive directional MAC protocol for ad hoc networks using directional antennas, Science China Information Sciences, Mar. 2012, Jun. 2012 vol. 55 No. 6: 1360-1371, doi: 10.1007/s11432-012-4550-6, Science China Press and Springer-Verlag Berlin Heidelberg 2012, XP055229437.
(Continued)

*Primary Examiner* — Andrew Lai
*Assistant Examiner* — Mahmudul Hasan
(74) *Attorney, Agent, or Firm* — Winston Hsu

(57) ABSTRACT

A communication method for a wireless network is disclosed. The wireless network comprises a plurality of wireless devices. The method comprises transmitting one or multiple packets with an omni-beam by a first wireless device to a second wireless device in a packet exchange during an omni-beam duration to indicate a sectorized-beam duration, receiving the packet(s) by a third wireless device,
(Continued)

transmitting/receiving data by the first wireless device using a sectorized beam in a packet exchange with the second wireless device during the sectorized beam duration, and detecting by the third wireless device the sectorized beam packet(s) from the first wireless device and packet(s) from the second wireless device, if no sectorized beam packet(s) from the first wireless device and packet(s) from the second wireless device is detected, the third wireless device starting to communicating with a fourth wireless device.

7 Claims, 4 Drawing Sheets

Related U.S. Application Data filed on Jul. 30, 2012, provisional application No. 61/718,291, filed on Oct. 25, 2012, provisional application No. 61/740,139, filed on Dec. 20, 2012.

(51) Int. Cl.
*H04B 7/0495* (2017.01)
*H04W 16/28* (2009.01)
*H04B 7/06* (2006.01)

(58) Field of Classification Search
USPC ......... 370/310, 328, 338, 335; 342/368, 378
See application file for complete search history.

(56) References Cited

U.S. PATENT DOCUMENTS

| | | | | |
|---|---|---|---|---|
| 2005/0026562 A1* | 2/2005 | Goldberg | ............... | H04W 16/28 455/25 |
| 2005/0141545 A1* | 6/2005 | Fein | ................. | H04B 7/0617 370/445 |
| 2006/0066483 A1* | 3/2006 | Goldberg | ................. | H04B 7/08 342/378 |
| 2006/0105771 A1* | 5/2006 | Iacono | ................. | H04W 16/28 455/446 |
| 2009/0196372 A1* | 8/2009 | Zhang | ................. | H04B 7/0417 375/267 |
| 2010/0046439 A1* | 2/2010 | Chen | .................. | H04W 48/08 370/329 |
| 2010/0150038 A1* | 6/2010 | Nanda | ................ | H01Q 1/246 370/310 |
| 2010/0172296 A1* | 7/2010 | Singh | ................. | H04W 84/18 370/328 |
| 2010/0177719 A1* | 7/2010 | Shao | ................ | H04W 74/0808 370/329 |
| 2010/0214169 A1* | 8/2010 | Kafle | ................ | H01Q 3/26 342/368 |
| 2010/0254466 A1 | 10/2010 | Wang | | |
| 2011/0065448 A1* | 3/2011 | Song | ................. | H04B 7/0632 455/452.2 |
| 2011/0069688 A1* | 3/2011 | Zhang | ................. | H04L 1/0083 370/338 |
| 2011/0128948 A1* | 6/2011 | Jeon | ................... | H04W 74/002 370/338 |
| 2011/0205969 A1* | 8/2011 | Ahmad | ................. | H04W 16/28 370/328 |
| 2011/0211490 A1* | 9/2011 | Nikula | ................ | H04B 7/086 370/252 |
| 2011/0287796 A1* | 11/2011 | Jain | ................... | H04W 72/046 455/509 |
| 2012/0051338 A1* | 3/2012 | Seok | ................. | H04W 74/085 370/337 |
| 2012/0082109 A1* | 4/2012 | Hong | ................. | H04W 48/08 370/329 |
| 2012/0099856 A1* | 4/2012 | Britz | ................. | H04B 10/90 398/26 |
| 2012/0327870 A1* | 12/2012 | Grandhi | ................. | H04W 28/06 370/329 |
| 2015/0016385 A1* | 1/2015 | Aiba | ................. | H04L 5/0053 370/329 |

OTHER PUBLICATIONS

Masanori Takata et al., A MAC Protocol with Directional Antennas for Deafness Avoidance in Ad Hoc Networks, Nov. 2007, pp. 620-625, IEEE GLOBECOM 2007, XP031196049.

"International Search Report" dated Oct. 25, 2013 for International application No. PCT/SG2013/000289, International filing date Jul. 10, 2013.

* cited by examiner (a)

(b)

(a)

(b)

SECTORIZED BEAM OPERATION FOR WIRELESS NETWORKS

BACKGROUND OF THE INVENTION

Field of the Invention

The present invention relates to a sectorized beam operation in a wireless network, and in particular relates to a sectorized beam operation for reduced interference, enhanced robustness, and increased capacity in multiple, overlapping wireless networks deployment scenarios.

Description of the Related Art

FIG. 1 shows a CSMA-based wireless system with a basic service set 1 BSS-1, including an access point (AP) 10 and a station (STA) 20, and an overlapping basic service set 2 BSS-2, including an access point AP 11 and a station STA 21. The coverage 30 of the basic service set BBS-1 overlaps a part of the coverage 31 of the basic service set BBS-2. The two BSSs are called, overlapping BSS, OBSS. When any of the access points APs 10, 11 or station STAs 20, 21 tries to access the channels for wireless transmission, it performs a channel sensing and a random back-off contention procedure. Any of the station or access point wins the contention can transmit into the wireless medium to gain the transmit opportunities (TXOP) and other stations or access point sense that the channel is busy would defer their transmission until the TXOP is over. Such carrier sense multiple access, (CSMA,) wireless protocol minimizes the likelihood of collision in which more than one station or access point transmit into the wireless medium causing the reception at the intended recipient to fail. In general, the CSMA protocol is intended for devices (station or access point) with omni-direction antennas such that the all the devices sharing the wireless medium can hear one another. However, if one device cannot hear another device in the same wireless medium, it is called a hidden node. With a hidden node in the wireless network, potential collision can occur since the device is unable to sense the transmission of the other devices. Note that since the two wireless networks (e.g. BSS-1 and BSS-2 in this example) are sharing the same wireless medium for transmission, the achievable throughput of each individual network is reduced whereas the aggregate network throughput of the two wireless networks remains approximately the same. For long range outdoor networks, the increased coverage range results in many overlapping wireless networks within the same area leading to significant reduction in the throughput of the individual network. Therefore, there's a need to manage the communication in wireless networks with overlapping coverage.

SUMMARY OF THE INVENTION

The present invention discloses a wireless communication method. The method comprises transmitting by a first wireless device a sectorized beam duration in an omni-beam duration, and transmitting/receiving data between the first wireless device and a second wireless device using a sectorized beam during the sectorized beam duration.

The present invention also discloses a communication method for a wireless network, wherein the wireless network comprises a plurality of wireless devices. The method comprises transmitting a one or multiple packet(s) with an omni-beam by a first wireless device to a second wireless device in a packet exchange during an omni-beam duration to indicate a sectorized-beam duration, receiving the packets from the first device by a third wireless device, transmitting/receiving data by the first wireless device using a sectorized beam while exchanging packets with the second device during the sectorized beam duration, and detecting by the third wireless device the sectorized beam packets from the first wireless device and packets from the second wireless device, if no sectorized beam packets from the first wireless device and packets from the second wireless device is detected, the third wireless device starting to communicating with a fourth wireless device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
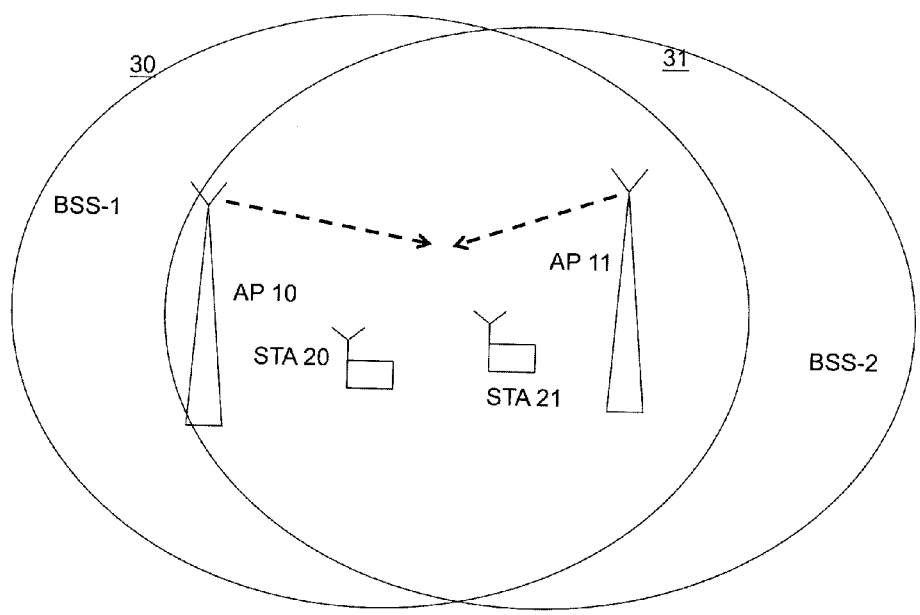
FIG. 1 shows a scenario of two overlapping wireless networks.
Figure 2:
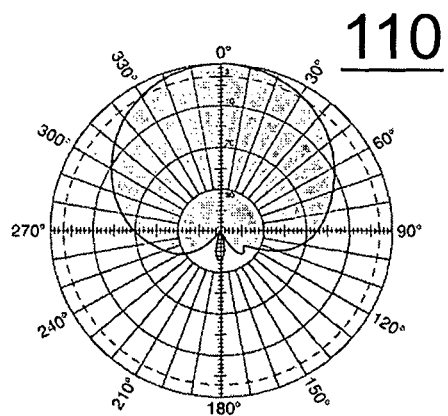
FIG. 2 shows a sectorized beam with an omni-beam overlay according to an embodiment of the present invention.
Figure 2:
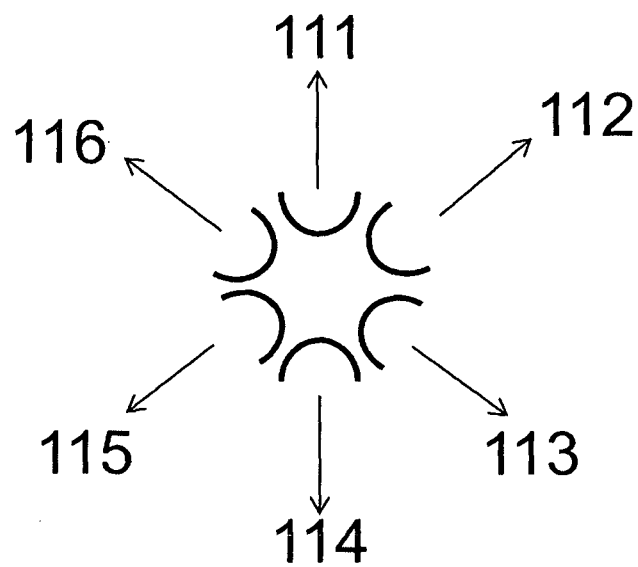

FIG. 2 provides an illustration of the sectorized beams with an omni-beam overlay. Note that a sectorized beam pattern 110 in FIG. 2(a) can be realized by a panel sector antenna or other synthesized antenna methods. The six sectorized beams 111, 112, 113, 114, 115, 116 in FIG. 2(b) can be realized by duplicating the sectorized beam pattern 110 in FIG. 2(a) six times in 60 degree increments. An omni-beam pattern can also be realized by transmitting through all six sectorized beams simultaneously. It should be noted that these beams can be employed both for transmission and reception. The spatial reciprocity condition in which the transmission and reception uses the same antenna pattern can be a precondition. For those skilled in the art may appreciate that there are many other ways to generate the sectorized beams.

Figure 3:
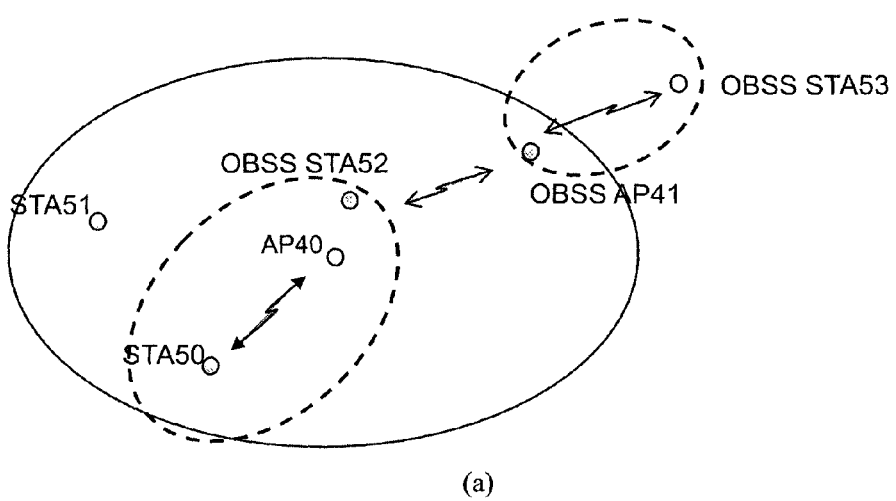
FIG. 3 shows two overlapping wireless networks based on proposed invention.
Figure 3:

FIG. 3 provides an illustration of the spatially orthogonal frame exchange. The present invention can be based on the sectorizd-beam transmission and reception frame exchange between an access point and a station within a TXOP. In a different TXOP, the frame exchange involving a different sectorized beam can be employed. There may be no dependence from one TXOP to another TXOP. The present invention also does not limit how the BSSs are deployed within a geographical area. For the sake of description, it is assumed that an access point (AP), employs sectorized-beam antennas and the AP can switch between the omni-beam transmission/reception and the sectorized beam transmission/reception. However, for those skilled in the art may appreciate that a non-AP station can employ the sectorized-beam transmission and reception and use the present invention.

The sectorization scheme according to an embodiment of the present invention can be described as two parts. The first part involves the two wireless devices (e.g., an access point

40 and a station 50 in FIG. 3(*a*)) engages in frame exchange in a TXOP 100 shown in FIG. 3(*b*). The frame exchange starts with a brief omni-beam frame exchange duration 101 and then follows with the sectorized beam frame exchange duration 102. During the omni-beam transmission duration 101, the access point 40 advertises to all other stations 41, 52, 53, 54 within the range that a frame exchange has started (TXOP 100 obtained), the duration of the frame exchange (via the network allocation vector, NAV setting), and optionally the intention to switch to a sectorized beam shortly. At the end of the omni-beam transmission duration 101, the access point switches to the sectorized beam transmission/reception 102 for the remainder of the frame exchange. Note that an embodiment of the present invention mandates that the access point continues to use the same sectorized beam transmission/reception through the duration indicated in the NAV setting. Other stations such as STA 51 associated the same BSS receive the frame exchange during the omni-beam transmission duration, defer based on a NAV setting realizing that the access point is busy engaging in a frame exchange with a station for the duration 100.

The second part of the scheme involves how the OBSS access points or stations 41, 52, 53 intending to start a new frame exchange, without waiting for the end of TXOP 100, should detect the spatially orthogonal condition as a precondition to spatially reuse the wireless medium. For an OBSS station 52, or 53 or access point 41, the spatially orthogonal condition means that the OBSS station 52, or 53 or access point 41 does not hear the sectorized beam transmission from the access point 40 and the transmission of the station 50 involving in the frame exchange. Having to satisfy this spatially orthogonal condition would prevent the OBSS station 52, or 53 or access point 41 to interfere with the frame exchange between the Access point 40 and station 50. If the spatially orthogonal condition is met, the OBSS station 52, or 53, or access point 41 is allowed to reset its NAV setting and starts a spatially orthogonal (SO) frame exchange during the sectorized beam duration 102. An embodiment of the present invention mandates that the new SO frame exchange to start with a request to send, (RTS,) and clear to send, (CTS,) exchange. The station which is the intended recipient of the RTS can respond with a CTS only if its NAV setting is zero at the time the RTS is received. This ensures that the intended recipient station of the RTS also does not cause interference to both the station 50 and access point 40 if they are within its range.

Note that the BSS practices the above scheme of the present invention shall indicate the sectorized beam capability during the capability exchange, or in the probe response, association response or other type of packets. Another preferred embodiment is to carry an indicator in a signal preamble or signaling field to alert receiving stations of the frame exchange as described in the above. An OBSS access point or station capable of spatial orthogonal detection does not need to declare the capability but do need to follow the present invention for resetting NAV and for starting a new SO frame exchange. In order to facilitate OBSS access point or station to detect the SO frame exchange, an preferred embodiment is to include an indicator to be carried in a short frame such as clear to send, (CTS) which is transmitted before the sectorized beam frame exchange. This serves as an early indicator to OBSS access point and station that a sectorized beam frame exchange is forthcoming. Note that in the clear to send null data packet, the CTS can be configured as CTS-to-self packet by setting the Address Indicator field to RA (Receive Address) and the RA/Partial BSSID field to the address of the initiator of the sectorized beam frame exchange. The inclusion of the RA allows OBSS station and access point to know the initiator of the sectorized beam frame exchange.

In summary, the proposed sectorization operation can be defined by the following rules:

The switching between the omni-directional beam and the sectorization beam occurs during the interframe spacing between two consecutive packets or in-between the omni preamble and the beamformed preamble of a long preamble.

When an AP is aware of the sector in which a station is in, AP may transmit to or receive from the station using the sectorized beam either during the scheduled transmission such as restricted access window (RAW) or within a TXOP. Otherwise, AP transmits or receives through an omni directional beam to a station.

Once an AP transmits to a station through a sectorized beam, it shall use the same sectorized beam to receive from the station within the same TXOP.

Once the AP switches to the sectorized beam transmission during an exchange, it shall continue with the sectorized beam transmission with the same sectorized beam and the TXOP truncation is not allowed for the remainder of the protected duration. If there is transmission failure within the sectorized beamformed duration, the baseline recovery procedure using a PIFS interframe space) to regain channel access can be used and the same sectorized beam transmission and reception shall be applied.

Note that the forming of the sectorized beam(s) is known to those skilled in the art and is not restricted by the proposed invention. One of the preferred embodiment is to use n antennas to form beams, where n>1.

Note that through sectorized beam transmission and reception, the present invention reduces interference to OBSSs and is less susceptible to the OBSS interference thereby enhancing the robustness of the link. The present invention does not require coordination or synchronization between BSSs for such operation nor does it impose any restrictions on how BSSs should be deployed within a geographical area. This feature is particularly suitable for unlicensed wireless network operation in which BSS are deployed randomly in a geographic area as opposed to deployment of cellular networks which requires careful deployment planning to achieve high capacity. Through spatial re-use of the wireless medium, higher aggregate network capacity can be achieved. Note that the proposed scheme is backward compatible with the existing CSMA-CA based wireless system such as IEEE 802.11.

In the present invention, an AP needs to know the best sector to a station prior to sectorized beam frame exchange. For those skilled in the art may appreciate that there are many ways the sector information can be obtained by an access point and the present invention does not restrict in any way how this knowledge can be obtained. The sector training is one preferred embodiment to help the stations to determine the best sectors to communicate with the AP. Sector training requires the AP to transmit training NDPs (Null Data Packet), each transmitted through a different sectorized beam, over all sectors to allow the receiving stations to determine which sector is the best. The best sector might be chosen by a station based on instantaneous or averaged channel state information (CSI) or signal-to-noise ratio. The different methods of choosing the sector are known to those skilled in the art.

An embodiment of the NDP for sector training of the present invention is to employ CTS-NDP with the Address Indicator field sets to RA (receive address) and the RA Address/Partial BSSID field is set to partial AID of the AP. This is effectively a CTS-to-self transmission by the access point. The duration setting of the CTS, which counts down to zero in the last CTS-NDP, can be used to derive which sector it is transmitting. These training NDPs shall be transmitted consecutively and should be sent within a single TXOP. The training information is exchanged using a high throughput (HT) variant Control field, which is a format in 802.11ac. The present invention does not prevent AP to use other methods to determine the station's best sector.

Figure 4:
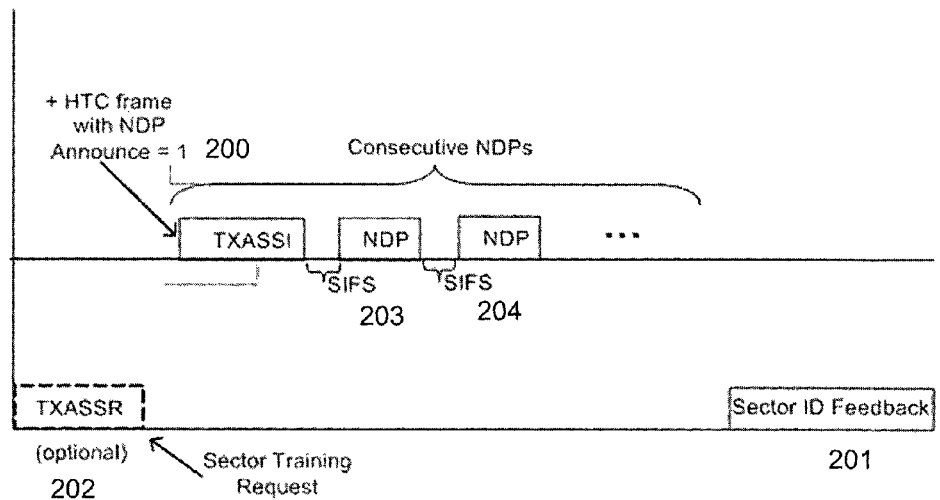
FIG. 4 illustrates the sector training frame exchange of the present invention.

Another embodiment of sector training is shown in FIG. 4. An an AP sends a sector training announcement 200 followed by a series of NDP sector training frames 203, 204 separated by SIFS. The sector training may occur periodically with the training period and the beacon interval in which the frequency of training and schedule beacon time as indicated in information element, e.g., Sector Operation element, carried in the beacon. The sector training may occur in response to a request from a STA, or initiated by the AP. In the case that the AP receives the sector training request from a station, the AP shall initiate a sector training. The total number of sectors is signaled during the AP capability exchange.

Note that the station participation in the sector training is optional. If the station can communicate with the AP well, the station can skip the sector training. The stations may also determine whether it is necessary to feedback the best sector to the access point or not. Obviously, if the best sector does not change, there is no need to feedback to the access point.

A preferred embodiment for a station to request Sector Training from AP by using the HT Variant Control field 200 if it is capable of sector training request as currently in the IEEE 802.11n and IEEE802.11ac standard amendments. By setting the MAI=14 in the Link Adaptation Control subfield of the HT Variant Control field, the station indicates HT variant control field is used for signaling Sector Training (or Antenna Selection) information. The Sector training (or sector training resumption) is requested by a station when the ASELC subfield is set to 1 and the ASEL Data subfield with values in the range of 1 to 15, being the number of the first NDP training frames to be transmitted when the command is Sector Training Resumption, where 0 corresponds to the first training frame in the Sector Training Request. When the NDP Announcement field is also set to 1, it indicates training NDP frames to follow with two consecutive training NDP frames 203, 204 separated by SIFS.

An embodiment of the present invention of the frame exchange sequence for sector training, where the AP transmits training NDP frames, and the STA provides Sector ID feedback. The frame exchange comprises the following steps:

a. (Optional) A station may initiate the sector training by sending a HTC+ (high throughput control) frame with the ASELC set to 1 for sector training request 202.

b. The AP sends out consecutive training NDPs separated by SIFS in a TXOP of which it is the TXOP holder with no ACK over different sectorized beams. NDP CTS frames, with NDP MAC Frame Type=3, are used in sector training. Each training NDP 203, 204 is transmitted over one sector beam. The first training NDP frame 203 shall be preceded by a HTC+ frame 200 with NDP announcement subfield set to 1. The positions of the training NDP frames correspond to the sector IDs of the sectorized beams, in ascending order starting with Sector ID=0.

c. The station(s) may perform training by estimating the received signal quality corresponding to each training NDP 203, 204.

d. The station(s) engages in the training by receiving the sector training frames may respond with a selected sector ID using the sector ID feedback frame in a subsequent TXOP or during Sector Report RAW which may be indicated by beacon for fast sector discovery of multiple STAs.

If the AP receives a HTC+ MPDU 200 with the MAI subfield equal to 14, the ASEL Command subfield equal to Sector Training Request (=1), and the ASEL Data subfield equal to a zero to correspond to the command Sector Training, the station shall assume a total number of training NDPs that corresponds to the total number of sectors. If the AP receives a HTC MPDU with the MAI subfield equal to 14, the ASEL Command subfield equal to Sector Training Request (=1), and the ASEL Data subfield equal nonzero value to correspond to the command Sector Training Resumption (a Resumption MPDU), the station shall assume the number of training frames that follow the Resumption MPDU is equal to the number of training NDPs from the total number of sectors minus the order number transmitted in the ASEL Data subfield of the Resumption MPDU.

AP may schedule sector sounding for multiple STAs by RAW in a beacon interval using the RAW Parameter Set element with the Sounding RAW Indication set to 1. During the Sounding RAW, non-AP STAs are prohibited to transmit but can elect to listen to the sector training for the entire RAW. This Sounding RAW may be scheduled in a periodic or impromptu way.

The sector training within the Sounding RAW starts with a frame with NDP announcement indicator set to 1 in the HT control field and is followed in SIFS by a number of NDP CTS frames, each transmitted through different antenna sector starting with Sector ID equal to 0, and separated by SIFS. The Sounding RAW indication sub-field set to 0 indicates no sector sounding is performed within the RAW.

A preferred embodiment of Sector ID feedback is for a station to optionally use a VHT action frame for (solicited and unsolicited) Sector ID feedback.

What is claimed is:

1. A wireless communication method, comprising:
transmitting information about a protection duration by a first wireless device to a second wireless device in an omni-beam duration of a transmit opportunity;
transmitting/receiving data by the first wireless device using a sectorized beam in a packet exchange with the second wireless device during a sectorized beam duration of the transmit opportunity; and
setting by a third wireless device a network allocation vector to zero if a spatial orthogonal condition is detected by the third wireless device when the first wireless device transmits/receives data using the sectorized beam;
wherein the protection duration covers the sectorized beam duration, and in the protection duration the first wireless device advertises to the second wireless device a duration of the packet exchange.

2. The method of claim 1, wherein the third wireless device has an overlapping signal range with the first wireless device or the second wireless device.

3. The method of claim 2, wherein the step of transmitting by the first wireless device information about the sectorized beam duration in an omni-beam duration further comprises, sending an indicator to the third wireless device informing the sectorized beam is forthcoming.

4. The method of claim 3, wherein the indicator is sent in a clear to send frame.

5. The method of claim 1, further comprising, transmitting by the third wireless device a request to send packet to a fourth wireless device to start a new transmit opportunity with the fourth wireless device.

6. The method of claim 1, wherein the sectorized beam is performed by a beamforming process via a plurality of antennas.

7. A communication method for a wireless network, wherein the wireless network comprises a plurality of wireless devices, the method comprising, transmitting a one or multiple packets with an omni-beam by a first wireless device to a second wireless device in a packet exchange during an omni-beam duration to indicate a sectorized beam duration;

receiving the packet from the first wireless device by a third wireless device;

transmitting/receiving data by the first wireless device using a sectorized beam in the packet exchange with the second device during the sectorized beam duration; and detecting by the third wireless device the sectorized beam at least one packet from the first wireless device and at least one packet from the second wireless device, if no sectorized beam packet from the first wireless device and no sectorized beam packet from the second wireless device is detected, the third wireless device starting to communicate with a fourth wireless device by setting a network allocation vector to zero when the first wireless device transmits/receives data using the sectorized beam.

* * * * *